(12) United States Patent
Suzuki et al.

(10) Patent No.: US 8,418,724 B2
(45) Date of Patent: Apr. 16, 2013

(54) SOLENOID VALVE

(75) Inventors: Masaru Suzuki, Chiryu (JP); Masaya Segi, Okazaki (JP); Kaori Fujita, Kariya (JP)

(73) Assignee: JTEKT Corporation, Osaka (JP)

( * ) Notice: Subject to any disclaimer, the term of this patent is extended or adjusted under 35 U.S.C. 154(b) by 406 days.

(21) Appl. No.: 12/820,590

(22) Filed: Jun. 22, 2010

(65) Prior Publication Data

US 2010/0326552 A1 Dec. 30, 2010

(30) Foreign Application Priority Data

Jun. 30, 2009 (JP) ................................ 2009-155821

(51) Int. Cl.
*F16K 11/07* (2006.01)
(52) U.S. Cl.
USPC ................................ 137/625.69; 137/625.64
(58) Field of Classification Search ............... 137/625.2, 137/625.6, 625.64, 625.65, 625.69
See application file for complete search history.

(56) References Cited

U.S. PATENT DOCUMENTS

| 4,605,197 | A * | 8/1986 | Casey et al. ................. 251/30.01 |
| 5,197,507 | A * | 3/1993 | Miki et al. ......................... 137/1 |
| 6,453,947 | B1 * | 9/2002 | Inoue et al. ............... 137/625.65 |
| 6,922,124 | B2 | 7/2005 | Segi et al. |
| 6,953,186 | B2 | 10/2005 | Kaneda et al. |
| 7,412,989 | B2 | 8/2008 | Segi et al. |
| 7,513,272 | B2 | 4/2009 | Segi et al. |
| 2006/0011245 | A1 | 1/2006 | Suzuki et al. |

FOREIGN PATENT DOCUMENTS

JP    A-2006-083879    3/2006

* cited by examiner

*Primary Examiner* — Craig Schneider
*Assistant Examiner* — Ian Paquette
(74) *Attorney, Agent, or Firm* — Oliff & Berridge, PLC

(57) ABSTRACT

In a solenoid valve, multiple flow-blocking portions are formed in a passage between a supply port (23) and an output port (24) and a passage between the output port (24) and a drain port (25). The flow-blocking portions, having an overlap length that corresponds to the movement amount of a spool (30), are formed by the outer peripheral faces of lands (32, 33) and the inner peripheral face of a spool case (10).

4 Claims, 3 Drawing Sheets

SOLENOID VALVE

INCORPORATION BY REFERENCE

The disclosure of Japanese Patent Application No. 2009-155821 filed on Jun. 30, 2009 including the specification, drawings and abstract is incorporated herein by reference in its entirety.

BACKGROUND OF THE INVENTION

1. Field of the Invention

The invention relates to a solenoid valve in which a spool provided in a valve hole is moved by electromagnetic force so that the state of communication among ports that open into the valve hole is adjusted.

2. Description of the Related Art

A solenoid valve as described in, for example, Japanese Patent Application Publication No. 2006-83879 (JP-A-2006-83879) is used for hydraulic control of, for example, an automatic transmission (AT) or a continuously variable transmission (CVT). This solenoid valve is formed of a solenoid portion and a spool control valve. The solenoid portion includes a plunger that is driven by electromagnetic force. The spool control valve includes a spool that is provided in a valve hole formed in a spool case and that moves within the valve hole in accordance with the movement of the plunger.

In the spool case, a supply port, an output port, and a drain port that open into the valve hole are formed so as to align in the direction in which the spool moves. The spool has a land that has an outer peripheral face that conforms to the inner peripheral face of the spool case. A flow-blocking portion having an overlap length corresponding to the movement amount of the spool is formed by the outer peripheral face of the land and the inner peripheral face of the spool case. By changing the overlap length of the flow-blocking portion formed between the ports, the state of communication between the ports is adjusted. As a result, the hydraulic pressure is controlled.

For example, in the non-energized state where electromagnetic force is not applied to the plunger, the spool is urged by a spring provided in the spool case and the land is placed at such a location that the flow-blocking portion is formed between the drain port and the output port. If the spool is at this location, communication between the output port and the drain port is blocked, communication between the output port and the supply port is provided, and the pressure in the supply port is introduced into the output port. On the other hand, when the plunger is driven by electromagnetic force, the spool is moved against the urging force of the spring and the land is placed at such a location that the flow-blocking portion is formed between the supply port and the output port. Thus, communication between the output port and the supply port is blocked, communication between the output port and the drain port is provided, and the pressure in the output port decreases.

In this solenoid valve, however, the hydraulic fluid leaks from a narrow gap between the inner peripheral face of the spool case and the outer peripheral face of the land, at the flow-blocking portion formed between the ports. As a result, the pressure in each port decreases in accordance with the amount of leaked hydraulic fluid. Therefore, in order to make up for a decrease in the pressure, the output from a pump that supplies the hydraulic fluid to the solenoid valve needs to be increased. In recent years, there has been a demand to reduce the flow amount of hydraulic fluid that is consumed (hereinafter, referred to as "consumption flow amount") (i.e. flow amount of hydraulic fluid that is leaked) between the ports to suppress an increase in the output from the pump, in the view of energy saving. As one of the methods for reducing the consumption flow amount, increasing the overlap length of the flow-blocking portion formed between the ports may be employed. However, in order to increase the overlap length of flow-blocking portion, the movement amount (stroke amount) of the spool needs to be increased. This results in upsizing of the solenoid portion due to an increase in the amount of change in the load of the spring that urges the spool and a decrease in the solenoid attraction force. As a result, the accuracy of the hydraulic control may decrease.

SUMMARY OF THE INVENTION

It is an object of the invention to provide a solenoid valve with which the above-described problem is solved.

An aspect of the invention relates to a solenoid valve that includes: a spool case that has a supply port to which hydraulic fluid is supplied, an output port from which the hydraulic fluid is output, and a drain port from which the hydraulic fluid is drained, and that has a valve hole into which the supply port, the output port and the drain port are open; and a spool that is provided in the valve hole so as to be slidable in an axial direction of the spool case, and that has multiple lands that are formed so as to be apart from each other in the axial direction and that have outer peripheral faces that conform to an inner peripheral face of the spool case. In the solenoid valve, axial locations of the lands within the valve hole are changed by a movement of the spool within the valve hole, caused in accordance with a movement of a plunger that is driven by electromagnetic force, to form a flow-blocking portion, having an overlap length that corresponds to an amount of the movement of the spool, in a passage between the supply port and the output port and a passage between the output port and the drain port using an outer peripheral face of the land and the inner peripheral face of the spool case, whereby the state of communication among the ports is adjusted. The multiple flow-blocking portions are formed so as to be aligned in the axial direction in at least one of the passage between the supply port and the output port and the passage between the output port and the drain port.

In the configuration described above, the multiple flow-blocking portions are formed so as to be aligned in the axial direction in the passage between the supply port and the output port and the passage between the output port and the drain port. Thus, the amount of change in the overlap length of the flow-blocking portions with respect to the movement amount of the spool is increased based on the number of flow-blocking portions. Therefore, it is possible to reduce the amount of leakage of hydraulic fluid without increasing the stroke of the spool. Also, it is possible to reduce the movement amount of the spool based on an increase in the number of flow-blocking portions. Therefore, it is possible to downsize the solenoid valve in the direction in which the spool moves.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF THE EMBODIMENTS

Hereafter, a solenoid valve for hydraulic control of an automatic transmission (AT) according to a first embodiment of the invention will be described with reference to the accompanying drawings.

Figure 1:
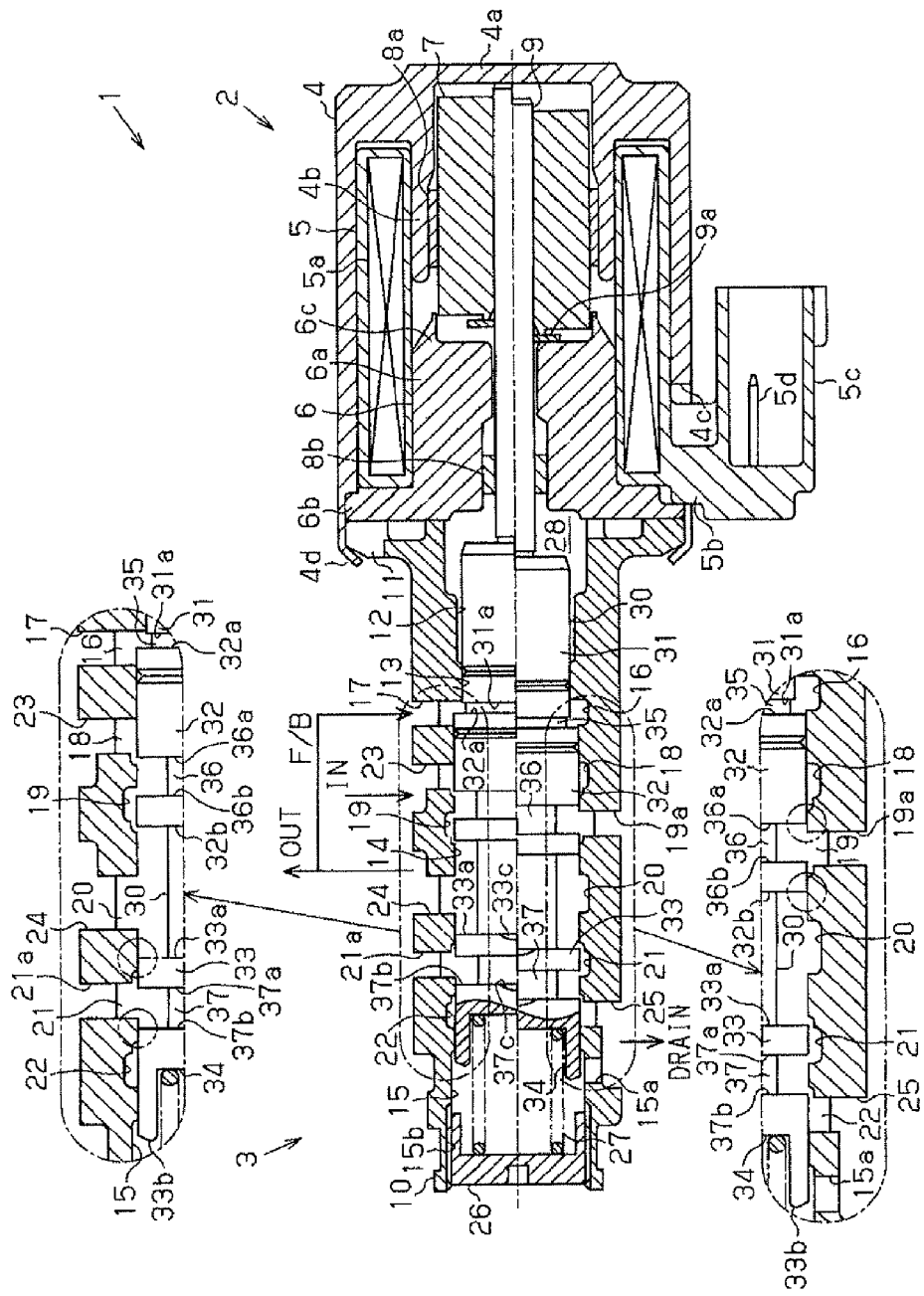
FIG. 1 is a cross-sectional view showing a solenoid valve according to a first embodiment.

As shown in FIG. 1, a solenoid valve 1 is formed of a solenoid portion 2, and a spool control valve 3 that is connected to the solenoid portion 2. The spool control valve 3 is fitted in a fitting recess that is formed in a valve body of an AT (not shown).

A case 4 of the solenoid portion 2 is made of magnetic material. The case 4 is a cylindrical member that has a bottom and that opens at a portion proximal to the spool control valve 3 (i.e. at a left-side portion in FIG. 1). A cylindrical plunger holding portion 4b is formed on a bottom 4a of the case 4 so as to surround the center of the bottom 4a. A cutout 4c is formed at an opening end portion of the case 4. A coil body 5 is provided between the inner peripheral face of the case 4 and the outer peripheral face of the plunger holding portion 4b. The coil body 5 is formed by coating a coil 5a with resin. The coil body 5 is a substantially cylindrical member that has an outer diameter substantially equal to the inner diameter of the case 4 and an inner diameter substantially equal to the outer diameter of the plunger holding portion 4b. The axial length of the coil body 5 is set to be longer than the axial length of the plunger holding portion 4b. The coil body 5 is fixedly fitted to the case 4 in such a manner that a portion of the coil body 5, which is proximal to the bottom 4a of the ease 4, is positioned on the outer side of the plunger holding portion 4b.

A connection portion 5b is formed in a portion of the coil body 5, which corresponds to the cutout 4c. The connection portion 5b projects outward from the case 4 with the cutout 4c formed between the connection portion 5b and the case 4. A connector portion 5c is formed at the end of the connection portion 5b. The connector portion 5c is a cylindrical member that has a bottom and that opens at a portion distant from the spool control valve 3 (i.e. at a right-side portion in FIG. 1). A connector pin 5d is provided on the inner side of the connector portion 5c. A base end portion of the connector pin 5d is connected to the coil 5a by a lead wire (not shown) embedded in the connection portion 5b. The coil body 5, the connection portion 5b, the connector portion 5c and the connector pin 5d are made of resin and formed integrally with each other.

A substantially cylindrical solenoid core 6 is provided in the opening of the case 4. The solenoid core 6 has a cylindrical portion 6a and a flange 6b. The cylindrical portion 6a is provided on the inner side of the coil body 5. The flange 6b is formed at an end portion of the cylindrical portion 6a, which is proximal to the spool control valve 3. The flange 6b is press-fitted to the inner face of the opening end portion of the case 4. The axial length of the cylindrical portion 6a is set to such a length that a gap is formed between the cylindrical portion 6a and the plunger holding portion 4b when the flange 6b is fixed to the case 4.

The plunger holding portion 4b holds a substantially cylindrical plunger 7. The outer diameter of the plunger 7 is slightly smaller than the inner diameter of the plunger holding portion 4b. The plunger 7 is movable in the axial direction of the plunger holding portion 4b. A bearing bush 8a is provided between the plunger holding portion 4b and the plunger 7. The plunger 7 is supported by the case 4 via the bearing bush 8a so as to be movable with respect to the case 4 in the axial direction. When the coil 5a is energized, attraction force is generated at a yoke portion 6c formed at a base end portion of the solenoid core 6. When the attraction force is applied to the plunger 7, the plunger 7 is attracted toward the solenoid core 6.

A shaft 9 is fixed to the inner periphery of the plunger 7. The shaft 9 passes through the cylindrical portion 6a of the solenoid core 6. An end portion of the shaft 9 projects from the flange 6b toward the spool control valve 3. A bearing bush 8b is provided between the solenoid core 6 and the shaft 9. The shaft 9 is supported by the solenoid core 6 via the bearing bush 8b so as to be movable with respect to the solenoid core 6 in the axial direction. Therefore, the plunger 7 and the shaft 9 that are fixed to each other are supported at the respective end portions by the case 4 and the solenoid core 6 via the bearing bush 8a and the bearing bush 8b, respectively.

A stopper 9a is fixed to the shaft 9. The stopper 9a restricts the movement of the plunger 7 toward the solenoid core 6 by contacting the cylindrical portion 6a of the solenoid core 6. The movement of the plunger 7 toward the bottom 4a of the case 4 is restricted when a base end portion of the shaft 9 contacts the bottom 4a of the case 4. Accordingly, the plunger 7 and the shaft 9 are movable in the axial direction within a range from the position at which the shaft 9 contacts the bottom 4a of the case 4 (plunger holding portion 4b) (shown in the state on the upper side of an axis indicated by a chain line in FIG. 1) and the position at which the stopper 9a contacts the cylindrical portion 6a of the solenoid core 6 (shown in the state on the lower side of the axis indicated by the chain line in FIG. 1).

A spool case 10 of the spool control valve 3 is a substantially cylindrical member. An annular rib 11 that has an outer diameter smaller than the inner diameter of the case 4 is formed at an end portion of the spool case 10, which is proximal to the solenoid portion 2. When a swaging piece 4d formed at the opening end portion of the case 4 is bent inward, the spool case 10 is fixed to the case 4 with the rib 11 kept in contact with the flange 6b of the solenoid core 6.

A valve hole 12 is formed on the inner side of the spool case 10. The valve hole 12 is communicated with the space in the cylindrical portion 6a of the solenoid core 6 when the spool case 10 is fixed to the case 4. The valve hole 12 has a first sliding hole 13, a second sliding hole 14, and a spring housing hole 15 that are aligned in this order from the solenoid portion 2-side. The diameter of the second sliding hole 14 is larger than the diameter of the first sliding hole 13, and the diameter of the spring housing hole 15 is larger than the diameter of the second sliding hole 14. Portions of the spool case 10, which define the sliding holes 13 to 15, are coaxial with the case 4, the solenoid core 6 and the plunger 7.

In a portion of the inner peripheral face of the spool case 10, which is at the boundary between the first sliding hole 13 and the second sliding hole 14, an annular groove 16 is formed. In addition, a feedback port 17 that communicates with the annular groove 16 is formed.

In a portion of the inner peripheral face of the spool case 10, which define the second sliding hole 14, a first annular groove 18, a second annular groove 19, a third annular groove 20, a fourth annular groove 21, and a fifth annular groove 22 are formed in this order from the solenoid portion 2-side. In a portion of the spool case 10, which corresponds to the first annular groove 18, a supply portion 23 that is communicated with the first annular groove 18 is formed. The hydraulic fluid is supplied to the supply port 23 from a pump (not shown). In a portion of the spool case 10, which corresponds to the third annular groove 20, an output port 24 that is communicated with the third annular groove 20 is formed. The hydraulic fluid is output from the output port 24 to the AT (not shown). In a portion of the spool case 10, which corresponds to the fifth annular groove 22, a drain port 25 that is communicated with the fifth annular groove 22 is formed. The hydraulic fluid is drained from the drain port 25 to an oil pan (not shown). A feedback passage (not shown) that is communicated with the feedback port 17 is formed in the valve body so that the pressure output from the output port 24 is fed back into the annular groove 16. In order to form the second annular groove 19 and the fourth annular groove 21 in the spool case 10 by casting, a through-hole 19*a* that is communicated with the second annular groove 19 and a through-hole 21*a* that is communicated with the fourth annular hole 21 are formed in the spool case 10. Each of the through-holes 19*a* and 21*a* is blocked by the valve body. In a portion of the spool case 10, which corresponds to the spring housing hole 15, a drain port 15*a* is formed. The drain port 15*a* is communicated with the spring housing hole 15, and drainage from the spring housing hole 15 is drained through the drain port 15*a*. A plug 26 is provided in the spring housing hole 15. The plug 26 is screwed into a thread groove 15*b* formed in a portion of the inner peripheral face of spool case 10, which define the spring housing hole 15. A spring 27 is housed in the spring housing hole 15 at an axial location closer to the solenoid portion 2 than the plug 26.

A spool 30 is provided in the valve hole 12 so as to be slidable in the axial direction. The spool 30 is a substantially columnar member that extends coaxially with the shaft 9. An end face of the spool 30, which is proximal to the shaft 9 (solenoid portion 2), contacts an end face of the shaft 9. The spring 27 is provided between an end portion of the spool 30, which is proximal to the plug 26 (a left-side portion in FIG. 1), and the plug 26. The spool 30 is always urged toward the shaft 9 by elastic force of the spring 27, and the spool 30 is moved together with the shaft 9 in the lateral direction in FIG. 1 while the spool 30 always contacts the shaft 9 due to the elastic force. Therefore, as shown in the state on the upper side of the axis indicated by the chain line in FIG. 1, the spool 30, the shaft 9 and the plunger 7 are held with the shaft 9 kept in contact with the bottom 4*a* of the case 4, in the non-energized state where the coil 5*a* is not energized. As shown in the state on the lower side of the axis indicated by the chain line in FIG. 1, the spool 30 moves toward the plug 26 in accordance with the movement of the shaft 9 and the plunger 7 until the stopper 9*a* contacts the cylindrical portion 6*a* of the solenoid core 6 and is held at this position, in the energized state where the coil 5*a* is energized.

The spool 30 has a first land 31, a second land 32, and a third land 33 that are aligned in this order from the solenoid portion 2-side. The first land 31 has an outer diameter substantially equal to the inner diameter of the portion of the spool case 10, which defines the first sliding hole 13. The second land 32 has an outer diameter substantially equal to the inner diameter of the portion of the spool case 10, which defines the second sliding hole 14. The third land 33 has an outer diameter substantially equal to the inner diameter of the portion of the spool case 10, which defines the second sliding hole 14. A spring housing recess portion 34 that opens toward the plug 26 is formed in an end portion of the third land 33, which is proximal to the plug 26. One end of the spring 27 is housed in the spring housing recess portion 34.

The first land 31 is formed in such a manner that an end face 31*a* of the first land 31, which is proximal to the second land 32, is at an axial location that corresponds to the annular groove 16 regardless of whether the coil 5*a* is in the energized state or the non-energized state. The axial length of a small-diameter portion 35 formed between the first land 31 and the second land 32 is set to be shorter than the axial length of the annular groove 16.

The second land 32 is formed in such a manner that an end face 32*a* of the second land 32, which is proximal to the first land 31, is at an axial location that corresponds to the annular groove 16 and an end face 32*b* of the second land 32, which is proximal to the third land 33, is at an axial location that corresponds to the second annular groove 19 when the coil 5*a* is in the non-energized state. In addition, the second land 32 is formed in such a manner that the end face 32*a* of the second land 32, which is proximal to the first land 31, is at an axial location that corresponds to the axial left end of the annular groove 16 and the end face 32*b* of the second land 32, which is proximal to the third land 33, is at an axial location between the second annular groove 19 and the third annular groove 20 when the coil 5*a* is in the energized state.

A first recess portion 36 that opens toward the inner peripheral face of the spool case 10 is formed in the entire circumference of the outer peripheral face of the second land 32. The first recess portion 36 is formed in such a manner that an inner face 36*a* of the first recess portion 36, which is proximal to the first land 31, is at an axial location that corresponds to the first annular groove 18 and an inner face 36*b* of the first recess portion 36, which is proximal to the third land 33, is at an axial location that corresponds to the second annular groove 19 when the coil 5*a* is in the non-energized state. In addition, the first recess portion 36 is formed in such a manner that the inner face 36*a* of the first recess portion 36, which is proximal to the first land 31, is at an axial location between the first annular groove 18 and the second annular groove 19 and the inner face 36*b* of the first recess portion 36, which is proximal to the third land 33, is at an axial location that corresponds to the second annular groove 19 when the coil 5*a* is in the energized state.

The third land 33 is formed in such a manner that an end face 33*a* of the third land 33, which is proximal to the second land 32, is at an axial location between the third annular groove 20 and the fourth annular groove 21 and an end face 33*b* of the third land 33, which is proximal to the plug 26, is at an axial location that is closer to the plug 26 than the fifth annular groove 22 when the coil 5*a* is in the non-energized state. In addition, the third land 33 is formed in such a manner that the end face 33*a* of the third land 33, which is proximal to the second land 32, is at an axial location that corresponds to the fourth annular groove 21 and the end face 33*b* of the third land 33, which is proximal to the plug 26, is at an axial location that is closer to the plug 26 than the fifth annular groove 22 when the coil 5*a* is in the energized state.

A second recess portion 37 that opens toward the inner peripheral face of spool case 10 is formed in the entire circumference of the outer peripheral face of the third land 33. The second recess portion 37 may be used as a recess portion according to the invention. The second recess portion 37 is formed in such a manner that an inner face 37*a* of the second recess portion 37, which is proximal to the second land 32, is at an axial location that corresponds to the fourth annular groove 21 and an inner face 37*b* of the second recess portion 37, which is proximal to the plug 26, is at an axial location between the fourth annular groove 21 and the fifth annular groove 22 when the coil 5*a* is in the non-energized state. In addition, the second recess portion 37 is formed in such a manner that the inner face 37*a* of the second recess portion 37, which is proximal to the second land 32, is at an axial location that corresponds to the fourth annular groove 21 and the inner face 37*b* of the second recess portion 37, which is proximal to the plug 26, is at an axial location that corresponds to the fifth annular groove 22 when the coil 5a is in the energized state.

In the end face 33a of the third land 33, which is proximal to the second land 32, and the inner face 37b of the second recess portion 37, which is proximal to the plug 26, there are formed a notch 33c and a notch 37c, respectively, which are used to drain a portion of the hydraulic fluid, introduced from the supply port 23 to the output port 24, to the drain port 25. Forming the notches 33c and 37c makes it possible to suppress generation of vibration that may be caused due to excessive fluctuations in the pressure of the hydraulic fluid.

In the solenoid valve 1 formed in the above-described manner, when the coil 5a is in the non-energized state, communication between the first annular groove 18 and the second annular groove 19 is provided by the first recess portion 36 of the second land 32 and a gap is formed between an end portion of the second land 32, which is proximal to the third land 33, and a portion of the inner peripheral face of the spool case 10, which is at the axial left end of the second annular groove 19. Thus, communication between the supply port 23 and the output port 24 is provided by the first recess portion 36, the second annular groove 19, and the third annular groove 20, that is, by a passage formed within the valve hole 12. In addition, when the coil 5a is in the non-energized state, a flow-blocking portion (indicated by a two-dot chain line) is formed by the outer peripheral face of a portion of the third land 33, which is proximal to the second land 32, and the inner peripheral face of the spool case 10. The flow-blocking portion is formed between the third annular groove 20 and the fourth annular groove 21. The outer peripheral face of the portion of the third land 33, which is proximal to the second land 32, and the inner peripheral face of the spool case 10 contact each other at the flow-blocking portion. In addition, when the coil 5a is in the non-energized state, a flow-blocking portion (indicated by a two-dot chain line) is formed by the outer peripheral face of a portion of the third land 33, which is closer to the plug 26 than the second recess portion 37, and the inner peripheral face of the spool case 10. The flow-blocking portion is formed between the fourth annular groove 21 and the fifth annular groove 22. The outer peripheral face of the portion of the third land 33, which is closer to the plug 26 than the second recess portion 37, and the inner peripheral face of the spool case 10 contact each other at the flow-blocking portion. That is, when the coil 5a is in the non-energized state, the two flow-blocking portions are formed so as to be aligned in the axial direction, in the passage that is formed within the valve hole 12 at a portion between the drain port 25 and the output port 24. Thus, communication between the drain port 25 and the output port 24 is blocked. As a result, the pressure in the supply port 23 is introduced into the output port 24.

On the other hand, when the coil 5a is energized, the spool 30 moves toward the plug 26 in accordance with the movement of the shaft 9 and the plunger 7 until the stopper 9a contacts the cylindrical portion 6a of the solenoid core 6, and is held at this position. Thus, when the coil 5a is in the energized state, a flow-blocking portion (indicated by a two-dot chain line) is formed by the outer peripheral face of a portion of the second land 32, which is closer to the first land 31 than the first recess portion 36, and the inner peripheral face of the spool case 10. The flow-blocking portion is formed between the first annular groove 18 and the second annular groove 19. The outer peripheral face of the portion of the second land 32, which is closer to the first land 31 than the first recess portion 36, and the inner peripheral face of the spool case 10 contact each other at the flow-blocking portion. In addition, when the coil 5a is in the energized state, a flow-blocking portion (indicated by a two-dot chain line) is formed by the outer peripheral face of a portion of the second land 32, which is closer to the third land 33 than the first recess portion 36, and the inner peripheral face of the spool case 10. The flow-blocking portion is formed between the second annular groove 19 and the third annular groove 20. The outer peripheral face of the portion of the second land 32, which is closer to the third land 33 than the first recess portion 36, and the inner peripheral face of the spool case 10 contact each other at the flow-blocking portion. That is, when the coil 5a is in the energized state, the two flow-blocking portions are formed so as to be aligned in the axial direction, in the passage formed in the valve hole 12 at a portion between the supply port 23 and the output port 24. Thus, communication between the supply port 23 and the output port 24 is blocked. In addition, when the coil 5a is in the energized state, communication between the fourth annular groove 21 and the fifth annular groove 22 is provided by the second recess portion 37 of the third land 33, and a gap is formed between an end portion of the third land 33, which is proximal to the second land 32, and a portion of the inner peripheral face of the spool case 10, which is at the axial right end of the fourth annular groove 21. Thus, communication between the drain port 25 and the output port 24 is provided by the fifth annular groove 22, the second recess portion 37, the fourth annular groove 21 and the third annular groove 20, that is, through the passage formed within the valve hole 12. As a result, the pressure in the output port 24 decreases.

As described above, the flow passage area between the supply port 23 and the output port 24 and the flow passage area between the output port 24 and the drain port 25 are appropriately changed by the flow-blocking portions having an overlap length that corresponds to the amount by which the spool 30 is moved in accordance with the movement of the plunger 7. The overlap length is a length of the flow-blocking portion, along which the land and the inner peripheral face of the spool case 10 overlap with each other. Thus, the pressure output from the output port 24 formed between the supply port 23 and the drain port 25 is adjusted.

The pressure output from the output port 24 (control pressure) is introduced into the annular groove 16 through the feedback passage. The output pressure is applied to the end face 31a of the first land and the end face 32a of the second land 32, which are connected to the small-diameter portion 35. Therefore, thrust force generated based on the difference in area between the first land 31 and the second land 32 is applied against the elastic force of the spring 27. That is, in the solenoid valve 1, the output pressure is adjusted to a pressure that corresponds to a value of an electric current supplied to the coil 5a based on the balance among the electromagnetic attracting force for attracting the plunger 7, which is applied in accordance with the value of the electric current supplied to the coil 5a, the urging force generated by the spring 27 and the force generated by the fed-back output pressure.

An oil reservoir 28 is formed at an end portion of the valve hole 12 of the spool case 10, which is proximal to the solenoid portion 2, when the rib 11 of the spool case 10 contacts the flange 6b of the solenoid core 6. The oil reservoir 28, a space between the inner periphery of the solenoid core 6 and the shaft 9 and a space between the plunger 7 and the plunger holding portion 4b are filled with the hydraulic fluid. When the hydraulic fluid flows through cutouts (not shown) formed in the bearing bushes 8a and 8b and the space formed between the plunger holding portion 4b and the plunger 7, damping effect is given to the operation of the plunger 7.

Next, the effects of the first embodiment will be described.

In the solenoid valve 1, communication between the supply port 23 and the output port 24 or communication between the output port 24 and the drain port 25 is blocked by the flow-blocking portions having the overlap length that corresponds to the amount by which the spool 30 is moved in accordance with the movement of the plunger 7. Thus, the pressure output from the output port 24 is adjusted. However, narrow gaps are formed between the outer peripheral faces of the lands 32 and 33 and the inner peripheral face of the spool case 10, which form the flow-blocking portions. Therefore, the hydraulic fluid leaks through the gaps. If the hydraulic fluid leaks, the output pressure decreases in accordance with the amount of leaked hydraulic fluid. Therefore, the output from the pump needs to be set taking into account the fact that a decrease in the output pressure due to the leakage needs to be made up for. In order to suppress an increase in the output from the pump, reduction of the leakage is demanded. As measures for reducing the leakage, the overlap length of the flow-blocking portions that are formed by the outer peripheral faces of the lands 32 and 33 and the inner peripheral face of the spool case 10 may be increased. In the first embodiment, as described above, the two flow-blocking portions that are formed by the outer peripheral face of the land 32 and the inner peripheral face of the spool case 10 are formed so as to be aligned in the axial direction, in the passage between the supply port 23 and the output port 24, and the two flow-blocking portions that are formed by the outer peripheral face of the land 33 and the inner peripheral face of the spool case 10 are formed so as to be aligned in the axial direction between the output port 24 and the drain port 25. Therefore, the amount of change in the overlap length of the flow-blocking portions with respect to the movement amount of the spool 30 is twice as large as that when one flow-blocking portion is formed between the supply port 23 and the output port 24 and one flow-blocking portion is formed between the output port 24 and the drain port 25. Therefore, as compared with the case where one flow-blocking portion is formed between the supply port 23 and the output port 24 and one flow-blocking portion is formed between the output port 24 and the drain port 25, it is possible to reduce the amount of leakage of hydraulic fluid without increasing the movement amount of the spool 30.

The effects of the first embodiment are as follows.
1) The two flow-blocking portions are formed so as to be aligned in the axial direction between the supply port 23 and the output port 24 and the two flow-blocking portions are formed so as to be aligned in the axial direction between the output port 24 and the drain port 25. Thus, the amount of change in the overlap length of the flow-blocking portions with respect to the movement amount of the spool 30 is increased based on the number of flow-blocking portions. Therefore, it is possible to reduce the amount of leakage of hydraulic fluid without increasing the movement amount of the spool 30. Also, it is possible to reduce the movement amount of the spool 30 based on an increase in the number of flow-blocking portions. Therefore, it is possible to downsize the solenoid valve in the direction in which the spool 30 moves.
2) A passage that connects the multiple flow-blocking portions that are formed so as to be aligned in the axial direction may be formed outside the valve hole 12. However, in this configuration, ports that open into the valve hole 12 need to be further formed. Therefore, the spool case 10 may be upsized by an amount corresponding to the ports. However, according to the configuration in the first embodiment, the first recess portion 36 and the second recess portion 37 are formed in the outer peripheral face of the second land 32 and the outer peripheral face of the third land 33. Therefore, a passage that connects the flow-blocking portions that are formed so as to be aligned in the axial direction is formed within the valve hole 12. Therefore, it is possible to avoid upsizing of the spool case 10 due to formation of the ports that open into the valve hole 12. As a result, it is possible to suppress upsizing of the solenoid valve 1.

Next, a second embodiment of the invention will be described. In the second embodiment, passages are formed outside the spool case in order to form multiple flow-blocking portions so as to be aligned in the axial direction in the passages between the ports. For convenience of explanation, the same configurations as those in the first embodiment will be denoted by the same reference numerals, and the description thereof will not be provided below.

Figure 2:
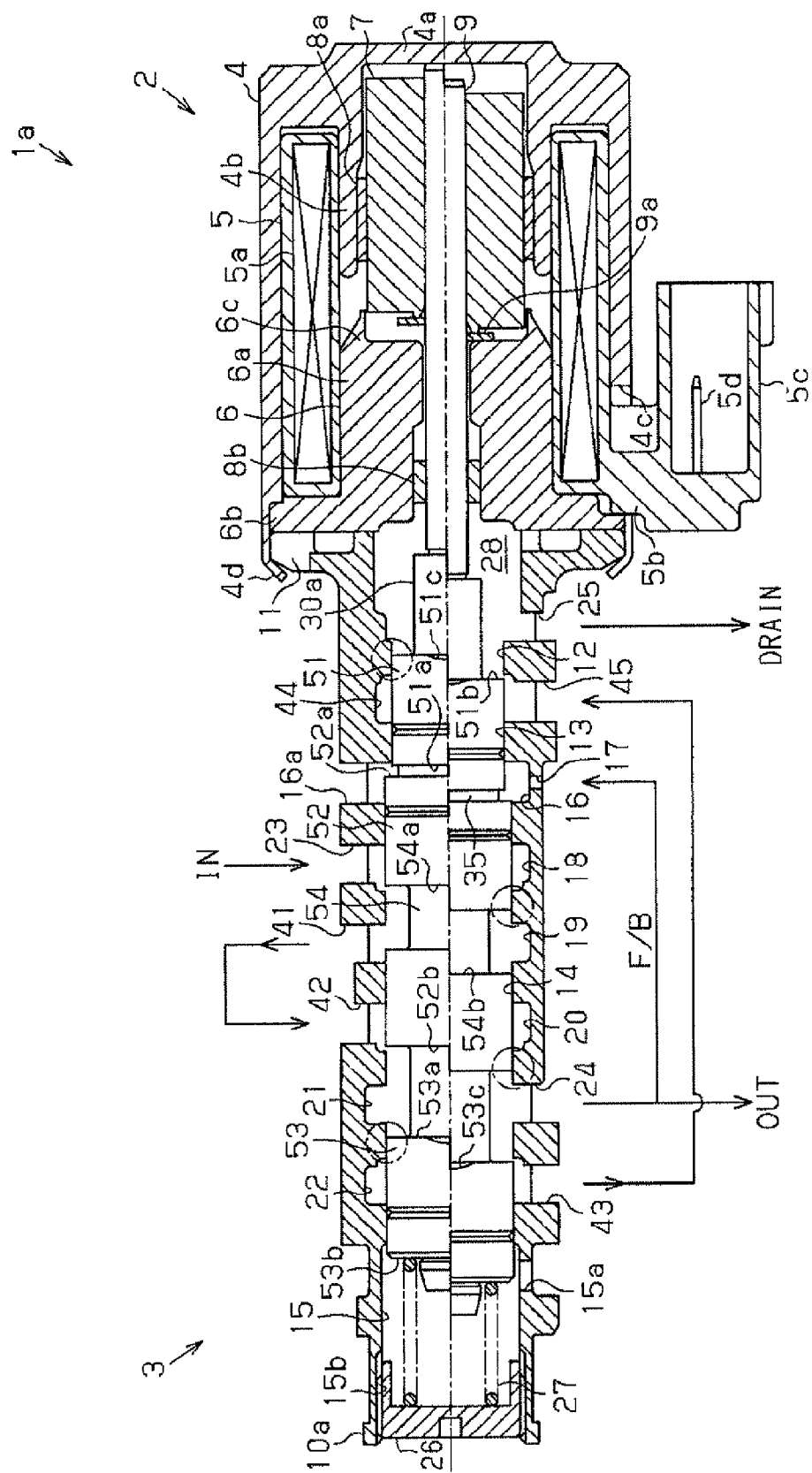
FIG. 2 is a cross-sectional view showing a solenoid valve according to a second embodiment.

As shown in FIG. 2, in the second embodiment, a first communication hole 41 that is communicated with the second annular groove 19 is formed in a portion of a spool case 10a, which corresponds to the second annular groove 19. Further, a second communication hole 42 that is communicated with the third annular groove 20 is formed in a portion of the spool case 10a, which corresponds to the third annular groove 20. Communication between the first communication hole 41 and the second communication hole 42 is provided by a passage (not shown) formed in the valve body.

The output port 24 that is communicated with the fourth annular groove 21 is formed in a portion of the spool case 10a, which corresponds to the fourth annular groove 21. The feedback passage (not shown) that is communicated with the feedback port 17 is formed in the valve body so that the pressure output from the output port 24 is fed back into the annular groove 16. In order to form the annular groove 16 in the spool case 10a by casting, a through-hole 16a that is communicated with the annular groove 16 is formed in the spool case 10a.

A third communication hole 43 that is communicated with the fifth annular groove 22 is formed in a portion of the spool case 10a, which corresponds to the fifth annular groove 22. In addition, a sixth annular groove 44 and a fourth communication hole 45 that is communicated with the sixth annular groove 44 are formed in the portion of the spool case 10a, which defines the first sliding hole 13. The sixth annular groove 44 and the fourth communication hole 45 are formed between the oil reservoir 28 and the annular groove 16. The drain port 25 that is communicated with the oil reservoir 28 is formed at a portion of the spool case 10a, which corresponds to the oil reservoir 28.

In a spool 30a, a first land 51, a second land 52 and a third land 53 are formed in this order from the solenoid portion 2-side. The first land 51 has an outer diameter substantially equal to the inner diameter of a portion of the spool case 10a, which defines the first sliding hole 13. The second land 52 has an outer diameter substantially equal to the inner diameter of a portion of the spool case 10a, which defines the second sliding hole 14. The third land 53 has an outer diameter substantially equal to the inner diameter of the portion of the spool case 10a, which defines the second sliding hole 14.

The first land 51 is formed in such a manner that an end face 51a of the first land 51, which is proximal to the second land 52, is at an axial location that corresponds to the annular groove 16 regardless of whether the coil 5a is in the energized state or the non-energized state. In FIG. 2, the state on the upper side of an axis indicated by a chain line shows the state where the coil 5a is not energized, and the state on the lower side of the axis shows the state where the coil 5a is energized.

The axial length of the small-diameter portion 35 formed between the first land 51 and the second land 52 is set to be shorter than the axial length of the annular groove 16.

The second land 52 is formed in such a manner that an end face 52a of the second land 52, which is proximal to the first land 51, is at an axial location that corresponds to the annular groove 16 and an end face 52b of the second land 52, which is proximal to the third land 53, is at an axial location that corresponds to the third annular groove 20 when the coil 5a is in the non-energized state. In addition, the second land 52 is formed in such a manner that the end face 52a of the second land 52, which is proximal to the first land 51, is at an axial location that corresponds to the axial left end of the annular groove 16 and the end face 52b of the second land 52, which is proximal to the third land 53, is at an axial location between the third annular groove 20 and the fourth annular groove 21.

A first recess portion 54, which opens toward the inner peripheral face of the spool case 10a, is formed in the entire circumference of the outer peripheral face of the second land 52. The first recess portion 54 is formed in such a mariner that an inner face 54a of the first recess portion 54, which is proximal to the first land 51, is at an axial location that corresponds to the first annular groove 18 and an inner face 54b of the first recess portion 54, which is proximal to the third land 53, is at an axial location that corresponds to the second annular groove 19 when the coil 5a is in the non-energized state. In addition, the first recess portion 54 is formed in such a manner that the inner face 54a of the first recess portion 54, which is proximal to the first land 51, is at an axial location between the first annular groove 18 and the second annular groove 19 and the inner face 54b of the first recess portion 54, which is proximal to the third land 53, is at an axial location between the second annular groove 19 and the third annular groove 20 when the coil 5a is in the energized state.

The third land 53 is formed in such a manner that an end face 53a of the third land 53, which is proximal to the second land 52, is at an axial location between the fourth annular groove 21 and the fifth annular groove 22 and an end face 53b of the third land 53, which is proximal to the plug 26, is at an axial location closer to the plug 26 than the fifth annular groove 22 when the coil 5a is in the non-energized state. In addition, the third land 53 is formed in such a manner that the end face 53a of the third land 53, which is proximal to the second land 52, is at an axial location that corresponds to the fifth annular groove 22 and the end face 53b of the third land 53, which is proximal to the plug 26, is at an axial location closer to the plug 26 than the fifth annular groove 22 when the coil 5a is in the energized state.

In the end face 53a of the third land 53, which is proximal to the second land 52, and the end face 51b of the first land 51, which is proximal to the solenoid portion 2, there are formed a notch 53c and a notch 51c, respectively, which are used to drain a portion of the hydraulic fluid, introduced from the supply port 23 to the output port 24, to the drain port 25. Forming the notches 53c and 51c makes it possible to suppress generation of vibration that may be caused due to excessive fluctuations in the pressure of the hydraulic fluid.

In the solenoid valve 1a formed in the above-described manner, when the coil 5a is in the non-energized state, communication between the first annular groove 18 and the second annular groove 19 is provided by the first recess portion 54 of the second land 52 and a gap is formed between an end portion of the second land 52, which is proximal to the third land 53, and a portion of the inner peripheral face of the spool case 10a, which is at the axial left end of the third annular groove 20. Thus, communication between the supply port 23 and the output port 24 is provided by the first annular groove 18, the first recess portion 54, the second annular groove 19, the first communication hole 41, the passage (not shown) formed in the valve body, the second communication hole 42 and the third annular groove 20. That is, communication between the supply port 23 and the output port 24 is provided by the passage formed outside the spool case 10a. In addition, when the coil 5a is in the non-energized state, a flow-blocking portion (indicated by a two-dot chain line) is formed by the outer peripheral face of a portion of the third land 53, which is proximal to the second land 52, and the inner peripheral face of the spool case 10a. The flow-blocking portion is formed between the fourth annular groove 21 and the fifth annular groove 22. The outer peripheral face of the portion of the third land 53, which is proximal to the second land 52, and the inner peripheral face of the spool case 10a contact each other at the flow-blocking portion. In addition, when the coil 5a is in the non-energized state, a flow-blocking portion (indicated by a two-dot chain line) is formed by the outer peripheral face of a portion of the first land 51, which is closer to the solenoid portion 2 than the sixth annular groove 44, and the inner peripheral face of the spool case 10a. The flow-blocking portion is formed between the sixth annular groove 44 and the oil reservoir 28. The outer peripheral face of the portion of the first land 51, which is closer to the solenoid portion 2 than the sixth annular groove 44, and the inner peripheral face of the spool case 10a contact each other at the flow-blocking portion. That is, when the coil 5a is in the non-energized state, the two flow-blocking portions are formed so as to be aligned in the axial direction in the passage that is formed between the drain port 25 and the output port 24. Thus, communication between the drain port 25 and the output port 24 is blocked. As a result, the pressure in the supply port 23 is introduced into the output port 24.

On the other hand, when the coil 5a is energized, the spool 30a moves toward the plug 26 in accordance with the movement of the shaft 9 and the plunger 7 until the stopper 9a contacts the cylindrical portion 6a of the solenoid core 6, and is held at this position. Thus, when the coil 5a is in the energized state, a flow-blocking portion (indicated by a two-dot chain line) is formed by the outer peripheral face of a portion of the second land 52, which is closer to the first land 51 than the first recess portion 54, and the inner peripheral face of the spool case 10a. The flow-blocking portion is formed between the first annular groove 18 and the second annular groove 19. The outer peripheral face of the portion of the second land 52, which is closer to the first land 51 than the first recess portion 54, and the inner peripheral face of the spool case 10a contact each other at the flow-blocking portion. In addition, when the coil 5a is in the energized state, a flow-blocking portion (indicated by a two-dot chain line) is formed by the outer peripheral face of a portion of the second land 52, which is closer to the third land 53 than the third annular groove 20, and the inner peripheral face of the spool case 10a. The flow-blocking portion is formed between the third annular groove 20 and the fourth annular groove 21. The outer peripheral face of the portion of the second land 52, which is closer to the third land 53 than the third annular groove 20, and the inner peripheral face of the spool case 10a contact each other at the flow-blocking portion. That is, when the coil 5a is in the energized state, the two flow-blocking portions are formed so as to be aligned in the axial direction in the passage formed between the supply port 23 and the output port 24. Thus, communication between the supply port 23 and the output port 24 is blocked. In addition, when the coil 5a is in the energized state, a gap is formed between an end portion of the third land 53, which is proximal to the second land 52, and a portion of the inner peripheral face of the spool case 10a, which is at the axial right end of the fifth annular groove 22, and a gap is formed between an end portion of the first land 51, which is proximal to the solenoid portion 2, and a portion of the inner peripheral face of the spool case 10a, which is at the axial right end of the sixth annular groove 44. Thus, communication between the drain port 25 and the output port 24 is provided by the fourth annular groove 21, the fifth annular groove 22, the third communication hole 43, the fourth communication hole 45, the sixth annular groove 44, and the oil reservoir 28. That is, communication between the supply port 23 and the output port 24 is provided by the passage formed outside the spool case 10a. As a result, the pressure in the output port 24 decreases.

Hereafter, a third embodiment will be described. In the third embodiment, the feedback passage that is formed in the valve body in the second embodiment is omitted. For convenience of explanation, the same portions as those in the first and second embodiments will be denoted by the same reference numerals as those in the first and second embodiments, and detailed description thereof will not be provided below.

Figure 3:
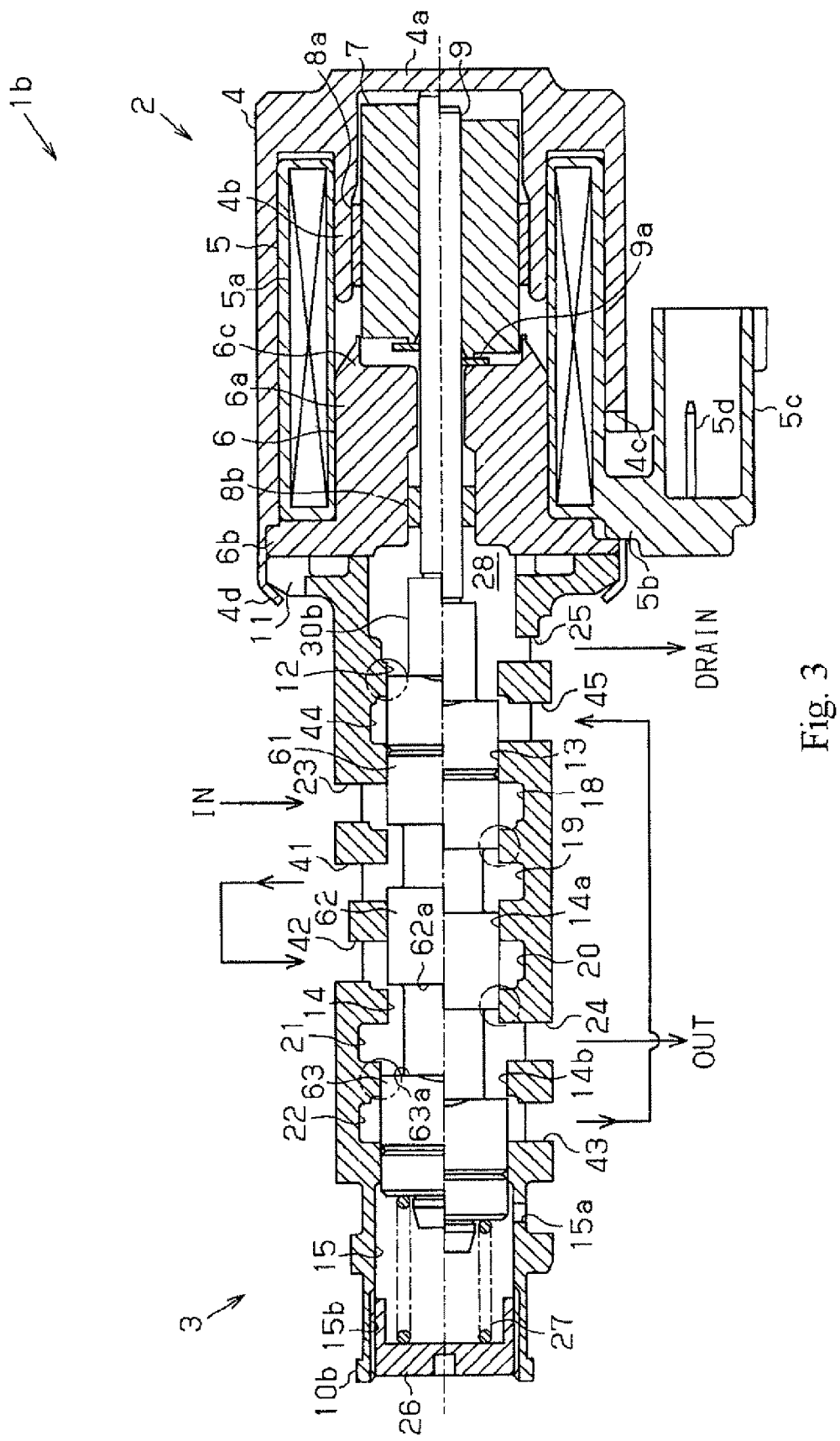
FIG. 3 is a cross-sectional view showing a solenoid valve according to a third embodiment.

As shown in FIG. 3, in the third embodiment, the cross sectional area of a first land 61 of a spool 30b is set to be equal to the cross sectional area of a second land 62 of the spool 30b. In addition, the cross sectional area of a third land 63 is set to be larger than the cross sectional area of the second land 62. A portion of the spool case 10b, which defines the first sliding hole 13, has an inner diameter that is substantially equal to the diameter of the first land 61. The second sliding hole 14 has a small-diameter hole 14a and a large-diameter hole 14b. The small-diameter hole 14a has a diameter that is substantially equal to the diameter of the second land 62. The large-diameter hole 14b has a diameter that is substantially equal to the diameter of the third land 63. The annular groove 16 and the feedback port 17 are omitted. In FIG. 3, the state on the upper side of an axis indicated by a chain line shows the state where the coil 5a is not energized, and the state on the lower side of the axis shows the state where the coil 5a is energized. The flow-blocking portions that are formed by the outer peripheral faces of the lands 61, 62 and 63, and the inner peripheral face of the spool case 10b are indicated by two-dot chain lines.

In the solenoid valve 1b that is configured in the above-described manner, the pressure output from the output port 24 is applied to an end face 62a of the second land 62, which is proximal to the third land 63, and an end face 63a of the third land 63, which is proximal to the second land 62. Therefore, force generated based on the difference in area between the second land 62 and the third land 63 is applied against the elastic force of the spring 27. With this configuration, it is possible to adjust the output pressure to a pressure that corresponds to a value of an electric current supplied to the coil 5a based on the balance among the above-described electromagnetic attracting force, the urging force generated by the spring 27 and the force generated by the fed-back output pressure, without forming the feedback passage.

The embodiments described above may be modified as below.

In the third embodiment, the feedback passage formed in the valve body in the second embodiment is omitted. In the first embodiment, for example, the cross-sectional area of the third land 33 may be set to be larger than the cross-sectional area of the second land 32, and the feedback passage may be omitted.

The notches 33c and 37c, and the notches 51c and 53c are formed between the output port 24 and the drain port 25 in the first embodiment and the second embodiment, respectively. However, the manner for forming the notches is not limited to this. For example, the notches 33c and 37c and the notches 51c and 53c between the output port 24 and the drain port 25 may be omitted, and notches may be formed between the supply port 23 and the output port 24. If notches are formed between the output port 24 and the drain port 25 or between the supply port 23 and the output port 24, the number of flow-blocking portions that are formed between the ports between which the notches are formed should be larger than the number of flow-blocking portions that are formed between the ports between which notches are not formed. With this configuration, it is possible to reduce the flow amount of hydraulic fluid that is consumed (hereinafter, referred to as "consumption flow amount") between the ports between which the notches are formed and the consumption flow amount is large. Accordingly, it is possible to make the consumption flow amount between the ports 23 and 24 and the consumption flow amount between the ports 24 and 25 substantially equal to each other. Therefore, it is possible to suppress upsizing of the solenoid valve 1, the solenoid valve 1a and the solenoid valve 1b. Also, it is possible to suppress upsizing of the pump.

Notches may be formed between the output port 24 and the drain port 25 and between the supply port 23 and the output port 24. Alternatively, the notches 33c and 37c and the notches 51c and 53c may be omitted.

In each embodiment described above, the invention is applied to the solenoid valve that is used for the hydraulic control of the AT. Alternatively, the invention may be applied to a solenoid valve used for hydraulic control of a CVT or a solenoid valve used for hydraulic control of another device.

What is claimed is:

1. A solenoid valve, comprising:
a spool case that including:
   a supply port to which hydraulic fluid is supplied;
   an output port from which the hydraulic fluid is output; and
   a drain port from which the hydraulic fluid is drained, and that has a valve hole into which the supply port, the output port and the drain port are open;
a spool that is provided in the valve hole so as to be slidable in an axial direction of the spool case, and that has multiple lands that are formed so as to be apart from each other in the axial direction and that have outer peripheral faces that conform to an inner peripheral face of the spool case; and
a plunger that is moved in an axial direction of the solenoid valve by electromagnetic force,
wherein, in the solenoid valve, axial locations of the lands within the valve hole are changed by a movement of the spool within the valve hole, caused in accordance with a movement of the plunger, to form a flow-blocking portion, having an overlap length that corresponds to an amount of the movement of the spool, in a passage between the supply port and the output port, and a passage between the output port and the drain port, using an outer peripheral face of the land and the inner peripheral face of the spool case, whereby a state of communication among the ports is adjusted,
multiple flow-blocking portions are formed so as to be aligned in the axial direction in at least one of the passage between the supply port and the output port, and the passage between the output port and the drain port,
in a non-energized state, at least two flow-blocking portions are formed so as to be aligned in the axial direction, in the passage that is formed within the valve hole at a portion between the drain port and the output port, and in an energized state, at least two flow-blocking portions are formed so as to be aligned in the axial direction, in the passage that is formed within the valve hole at a portion between the supply port and the output port.

2. The solenoid valve according to claim 1, wherein a recess portion that opens toward the inner peripheral face of the spool case is formed in the outer peripheral face of the land, and a passage that connects the multiple flow-blocking portions that are formed so as to be aligned in the axial direction is formed within the valve hole by the recess portion and the inner peripheral face of the spool case.

3. The solenoid valve according to claim 1, wherein in one of the lands that form the passage between the supply port and the output port and the land that forms the passage between the output port and the drain port, there is formed a notch for draining a portion of the hydraulic fluid from one of the ports to another port to avoid excessive fluctuation in a pressure of the hydraulic fluid, and the multiple flow-blocking portions are formed in the passage between the ports between which the notch is formed.

4. The solenoid valve according to claim 3, wherein a recess portion that opens toward the inner peripheral face of the spool case is formed in the outer peripheral face of the land, and a passage that connects the multiple flow-blocking portions that are formed so as to be aligned in the axial direction is formed within the valve hole by the recess portion and the inner peripheral face of the spool case.

\* \* \* \* \*